July 5, 1960

M. SALAK ET AL 2,943,713

BRAKE SHOES

Filed Feb. 26, 1957

INVENTORS.
MICHAEL SALAK
CHARLES R. KEATING, JR.
ROSSER L. WILSON
BY
Wallace and Cannon
ATTYS.

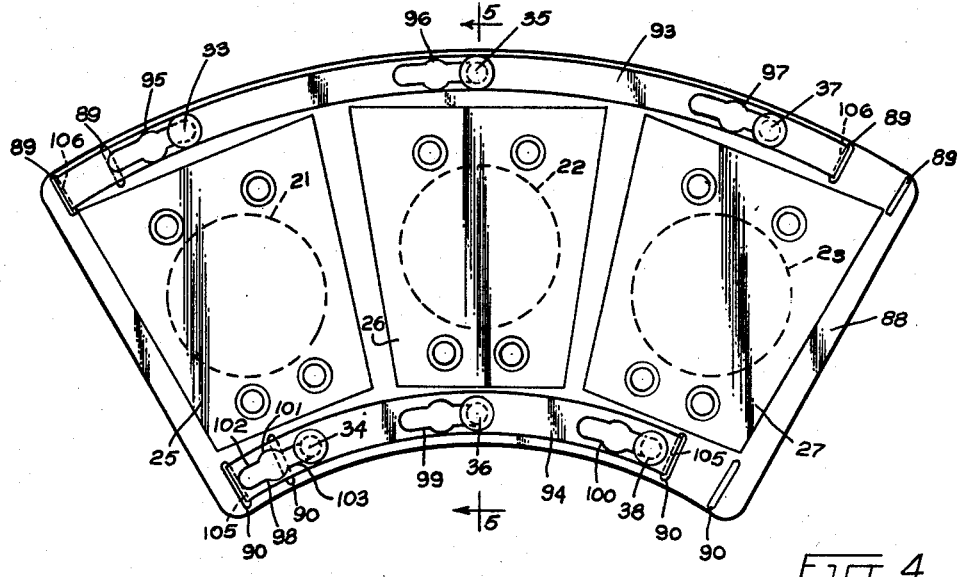
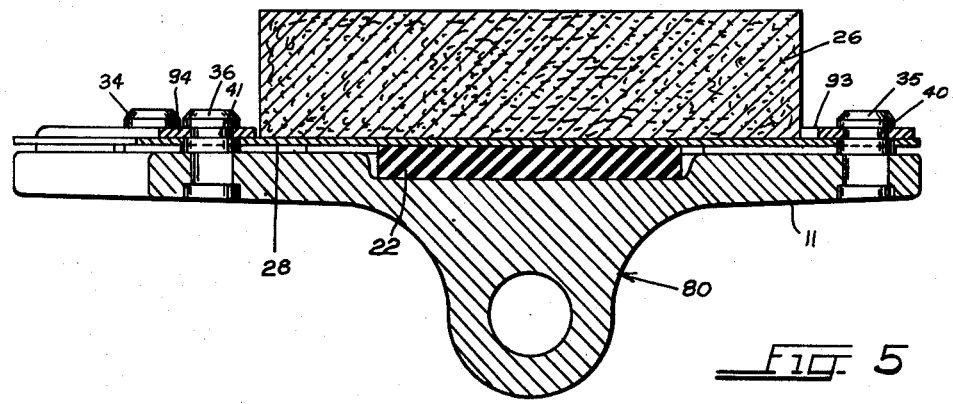
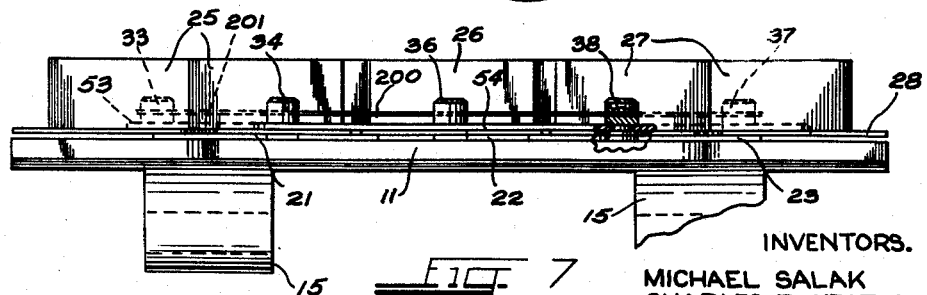
INVENTORS.
MICHAEL SALAK
CHARLES R. KEATING, JR.
ROSSER L. WILSON

United States Patent Office 2,943,713
Patented July 5, 1960

2,943,713

BRAKE SHOES

Michael Salak, Spring Valley, N.Y., and Charles R. Keating, Jr., Emerson, and Rosser L. Wilson, Mahwah, N.J., assignors to American Brake Shoe Company, New York, N.Y., a corporation of Delaware Filed Feb. 26, 1957, Ser. No. 642,446

3 Claims. (Cl. 188—251)

This invention relates to a new and improved brake unit particularly adapted to engage a radial surface of a brake rotor in frictional braking contact. The invention is especially useful in heavy duty applications such as the braking of railway vehicles and is described in that connection.

In general, railway braking has been accomplished with clasp-type brakes which directly engage the peripheral surface of the vehicle wheel. Although brakes of this type have in general given extremely satisfactory service, as evidenced by their continuing standardized use on the vast majority of railway engines and cars, as well as on other railway vehicles such as self-propelled cars and the like, there has been a considerable amount of experimentation in the railway industry relating to other types of brakes. One such braking system which has been seriously considered for use on railway equipment, and which has been placed in commercial service on a relatively limited number of railway vehicles, is the so-called disc-type brake. In a disc-type braking system, a separate rotor or disc is affixed to the railway vehicle axle for rotation with the wheel and is engaged by one or more brake shoes which may, for example, be coupled to a hydraulic actuating mechanism. These brake shoes do not engage the peripheral surface of the disc or rotor; rather, they effect the desired braking operation by engaging a radial surface of the brake disc. Usually, the disc is constructed as a self-cooling device in that it impels air through or over its surfaces as it rotates with the wheel; in some instances, the rotor comprises the wheel itself.

Disc-type braking systems have afforded relatively difficult problems with respect to the mounting and construction of the friction elements or brake shoes which engage the brake rotor. For effective braking action, it is essential that a relatively large portion of the brake shoe engage the radial surface of the disc or rotor; consequently, it is highly desirable that the brake unit afford some means for compensating for angular displacement of the brake shoe with respect to the rotor. Moreover, and as in other heavy duty braking applications, it is highly desirable that the brake unit afford some means for absorbing the initial shock to which the brake shoe is subjected at the time the brakes are applied. In addition, the brake unit must afford some means for resisting or absorbing the torque applied thereto in the course of the braking action.

Certain prior art arrangements have included provisions for shock absorption, torque transmission, and automatic brake shoe alignment in disc-type braking systems. These arrangements, although useful to a certain extent, have not proved completely satisfactory; as a result, brake units of this type have required relatively frequent replacement and have sometimes damaged the brake rotors with which they cooperate. Other prior art arrangements, although showing somewhat better performance characteristics, have been relatively expensive in construction and/or have required excessive labor time in replacement of worn or otherwise unusable brake shoes.

A primary object of the invention, therefore, is the provision of a new and improved brake unit for a disc-type braking system.

Another object of the invention is a new and improved brake unit for engaging a radial surface of a brake rotor which affords optimum shock absorption characteristics at a minimum cost.

A further object of the invention is a new and improved brake unit for a disc-type braking system which materially simplifies the procedure for replacement of brake shoes and thereby inherently reduces maintenance costs for the braking system.

A more specific object of the invention is the provision of a new and improved means for securing friction elements to a brake head in a disc-type braking system which provides positive interlocking of the friction elements and the brake head and thereby substantially reduces the possibility of damage to the braking system which could result from loss of one or more friction elements during operation.

A corollary object of the invention is a new and improved brake unit for a disc type braking system which is inherently simple and economical in construction and which affords maximum economy with respect to maintenance costs.

The invention thus relates to a brake unit for engaging a radial surface of a brake rotor in frictional braking contact. A brake unit constructed in accordance with the invention comprises a brake head of substantially arcuate configuration adapted to be supported with one face thereof in juxtaposition to the radial surface of a brake rotor. At least one resilient pad is supported upon the face of the brake head; preferably, a plurality of resilient pads are employed, the pads being mounted within but extending above individual recesses in the brake head face. The brake unit further includes a plurality of friction elements and a sheet metal carrier member which engages the friction elements and maintains them in effective shock-absorbing contact with the resilient pad or pads. The sheet metal carrier member is of arcuate configuration substantially corresponding to the configuration of the brake head face. A series of studs or posts are affixed to the brake head and extend from the face of the brake head through a corresponding series of apertures in the sheet metal carrier member. Each of these studs has a slot which is located above the exposed surface of the resilient pad or pads. A plurality of sheet metal retaining elements are utilized to retain the sheet metal carrier member in position upon the brake head; each of these retaining elements includes at least one segment and preferably several segments which engage in the slot in one of the studs. In some embodiments of the invention, the retaining elements comprise individual devices whereas in other embodiments the retaining elements are formed as an integral part of the sheet metal carrier member.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 4 is a plan view of a further embodiment of the invention;

Fig. 5 is a sectional view taken along line 5—5 in Fig. 4;

Fig. 7 is an elevation view, partly in section, showing an additional safety feature which may be utilized in conjunction with the invention.

Figure 1:
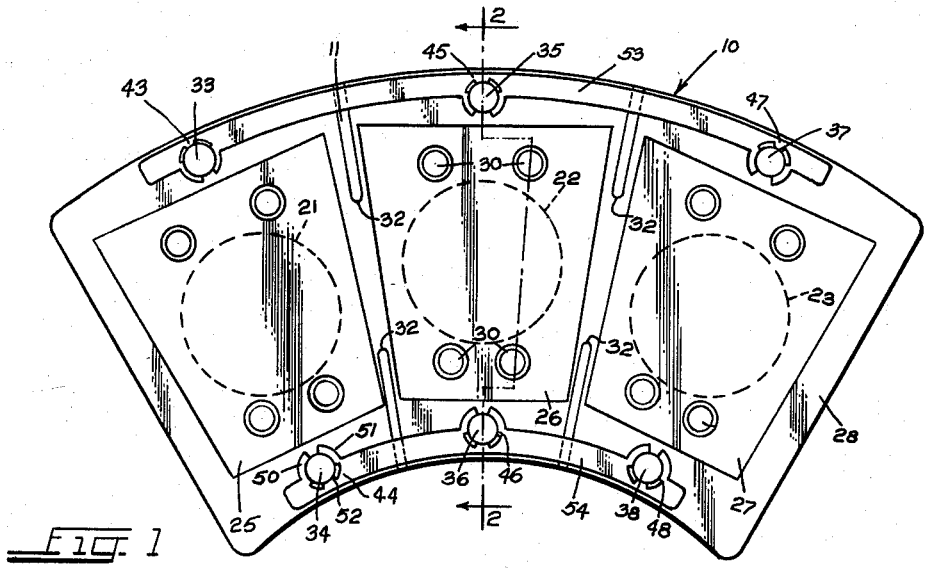
Fig. 1 is a plan view of a brake unit constructed in accordance with a preferred embodiment of the invention and shows the frictional elements which comprise a part of the brake unit.
Figure 2:
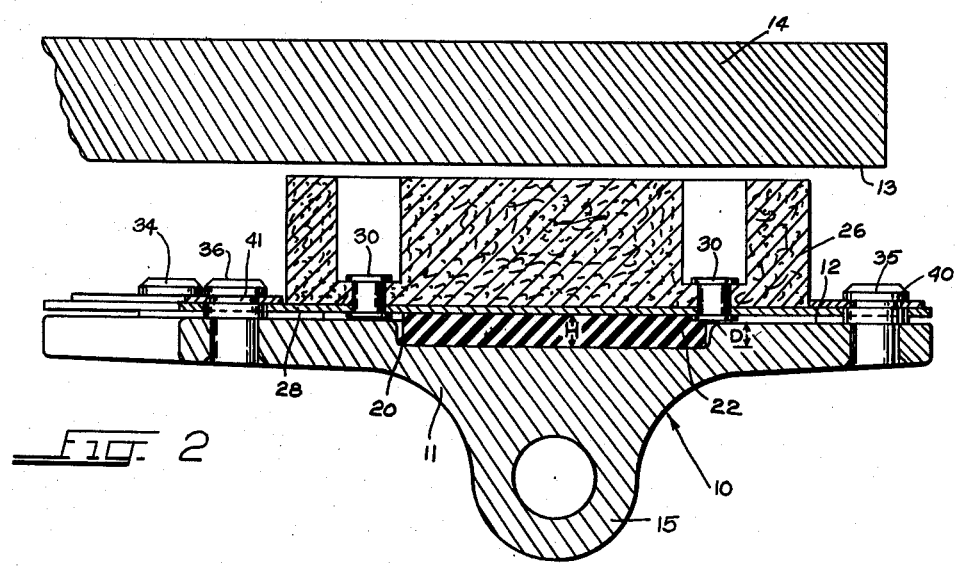
Fig. 2 is a sectional view taken along line 2—2 in Fig. 1 and illustrates the manner of engagement of the brake unit with a radial surface of a brake rotor.

The brake unit 10 shown in Figs. 1 and 2, which comprises a preferred embodiment of the invention, includes a brake head or support member 11 which is adapted to be supported with one face 12 thereof in juxtaposition to the radial surface 13 of a brake disc or rotor 14. The brake rotor 14 may be of any suitable size, configuration, and construction; inasmuch as the construction employed for members of this type is subject to wide variation, the brake rotor has been shown as a simple metal disc. It will be understood, of course, that the brake rotor may be of the self-ventilating type described in general terms hereinabove or may be of any other construction suitable for relatively heavy duty braking service. In some applications, the brake rotor 14 may comprise one of the wheels of a vehicle such as a railway car.

The brake head 11 is provided with one or more lugs 15 or other similar connecting members. The lug 15, or other suitable connecting means, is utilized to connect the brake head 11 to a suitable brake operating mechanism. Because the present invention is not concerned with nor restricted to any particular operating mechanism, the brake actuating system has not been shown in the drawings. It will be understood that the number and disposition of the connecting lugs or similar devices on brake head 11 is not critical insofar as the present invention is concerned and that any suitable mounting arrangement for the brake head may be adopted without departing in any way from the inventive concept.

The face 12 of brake head 11 is provided with a plurality of individual recesses of substantially uniform depth; in the illustrated brake unit, there are three such recesses as exemplified by the recess 20 shown in Fig. 2. Preferably, these three recesses are of circular configuration and of uniform depth, although other configurations may be employed if desired. A corresponding plurality of resilient pads 21, 22 and 23 are individually disposed in the brake head recesses and are preferably bonded or otherwise secured to the brake head 11. As best shown in Fig. 2, the height H of the resilient pads 21–23 is substantially greater than the depth D of the recesses so that the resilient pads extend above the face 12 of the brake head. In the illustrated embodiment, in which the recesses are of circular configuration, disc-shaped resilient pads are employed as the elements 21–23. Preferably, pads 21–23 are fabricated from a rubber or rubber-like material; they may, for example, be made of natural rubber, synthetic rubber, or any other suitable material having the requisite resilient characteristics.

The brake unit 10 further includes three friction elements 25, 26 and 27 which are disposed immediately above the resilient pads 21, 22 and 23 respectively. The three friction elements 25–27 are engaged by a sheet metal carrier member 28 which serves to retain the friction elements in effective shock-absorbing contact with the resilient pads. In the illustrated embodiment, the three friction elements are each individually affixed to the sheet metal carrier as by a plurality of rivets or similar fastening devices 30. The friction elements may equally well be secured to the sheet metal carrier by a suitable bonding technique or by any other means which affords adequate adhesion between the friction elements and the carrier. Moreover, it is not essential that the friction elements be affixed to the carrier; rather, other means may be provided for affording engagement between the carrier and friction elements to retain the latter in effective engagement with the resilient pads 21–23. For example, the friction elements may be provided with flanges at their bases which may be engaged by an apertured carrier member in the manner described in the pending application of Rosser L. Wilson, Serial No. 642,445, now Patent No. 2,904,138, filed concurrently herewith. Preferably, the sheet metal carrier member 28 is provided with a series of radially extending slots 32 which effectively increase the flexibility of the carrier member and permit limited independent movement of the individual friction elements with respect to each other.

The brake unit 10 further includes a series of studs 33, 34, 35, 36, 37 and 38 which are affixed to the brake head 11 and which extend above the face 12 of the brake head and through a corresponding series of apertures in the sheet metal carrier member 28. As best shown in Fig. 2, the stud 35 is provided with a peripheral slot 40 which is located somewhat above the exposed surface of the resilient pad 22; similarly, stud 36 is provided with a peripheral slot 41 spaced from surface 12 by the same amount as slot 40. The other studs 33, 34, 37 and 38 are similarly provided with slots which are aligned with slots 40 and 41 above the plane of the exposed surfaces of the resilient pads 21–23. These slots are engaged by retaining means comprising a series of retaining elements 43, 44, 45, 46, 47 and 48. As indicated in Fig. 1, each of these retaining elements includes a plurality of angularly displaced segments which engage in the slot of one of the studs. Thus, the retaining element 44 comprises three individual segments 50, 51 and 52 all of which engage in the slot in stud 34. Similar arrangements are afforded by the retaining elements which engage each of the other studs. Moreover, in the embodiment of Fig. 1 the three retaining elements 43, 45 and 47 comprise integral parts of a single retaining member or strip 53, whereas the other three retaining elements 44, 46 and 48 are fabricated as integral parts of a single sheet metal strip 54. These retaining elements hold the brake shoe comprising sheet metal carrier 28 and friction elements 25–27 in position on the brake head 11 with the surface of the carrier member 28 opposite the friction elements 25–27 in engagement with the rubber pads 21–23.

Manufacture and assembly of the brake unit 10 shown in Figs. 1 and 2 is extremely simple and economical. The brake head 11 is preferably fabricated as a single steel casting including the lug or lugs 15 and provided with suitable apertures for receiving the mounting posts or studs 33–38. The studs may be conveniently and economically fabricated from rod stock on automatic screw machines or by other similar mass production techniques and are preferably riveted or welded into the brake head, thereby becoming an integral part of the brake head structure. The friction elements 25–27 are formed in accordance with known techniques and may comprise molded composition type friction materials or may be of the woven composition impregnated variety. These friction elements are essentially similar to brake linings employed in a wide variety of applications; their composition and method of fabrication may be varied to suit the requirements of the braking system in which they are to be employed. The retainer strips 53 and 54, including retaining elements 43–48, may be manufactured from sheet metal by a very simple and economical punch press operation; the same technique is quite suitable for manufacture of the sheet metal carrier member 28.

As indicated above, the friction elements are bonded to the sheet metal carrier by a suitable cementing process or by riveting or other similar means. The rubber discs comprising resilient pads 21–23 are easily fabricated from sheet rubber and are preferably cemented into the recesses in the brake head face 12. The brake shoe comprising carrier 28 and the three friction elements is then placed in position over the brake head studs and the retaining strips are forced into engagement with the slots in the studs to complete the final assembly. To remove the brake shoe from the brake head, it is only necessary to strip away the two sets of retaining elements and remove the brake shoe comprising metal carrier 28 and the worn or otherwise damaged friction elements, after which a similar brake shoe may be placed upon the brake head and secured thereto by a pair of retainer strips.

Figure 2A:
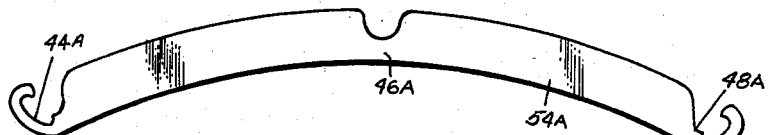
Fig. 2A shows a retaining member which may be used in the embodiment of Figs. 1 and 2.

It is not essential that each of the three retaining elements on the two retainer strips 53 and 54 be identical. Thus, the retainer strip 54 may be replaced by the strip 54A shown in Fig. 2A. Retainer strip 54A includes a pair of retaining elements 44A and 48A which are similar to the retaining devices 44 and 48 described above in connection with Fig. 1. The retaining element 46A, however, is somewhat modified in this embodiment as compared with retainer 46 of the previously described structure. In this instance, the center retaining element of the strip is defined by a semi-circular opening in the retainer strip which engages only one side of the slot in center post 36 (see Fig. 1). With this arrangement, the two end retaining elements 44A and 48A are relied upon to maintain the entire strip in engagement with the several mounting studs; the retainer 46A serves only to prevent movement of the carrier member axially of the stud at the center of the brake unit. A retaining strip of this type affords service characteristics essentially similar to those of the arrangement shown in Fig. 1 and has the additional advantage that it is even easier to assemble than the first-described arrangement.

Figure 3:
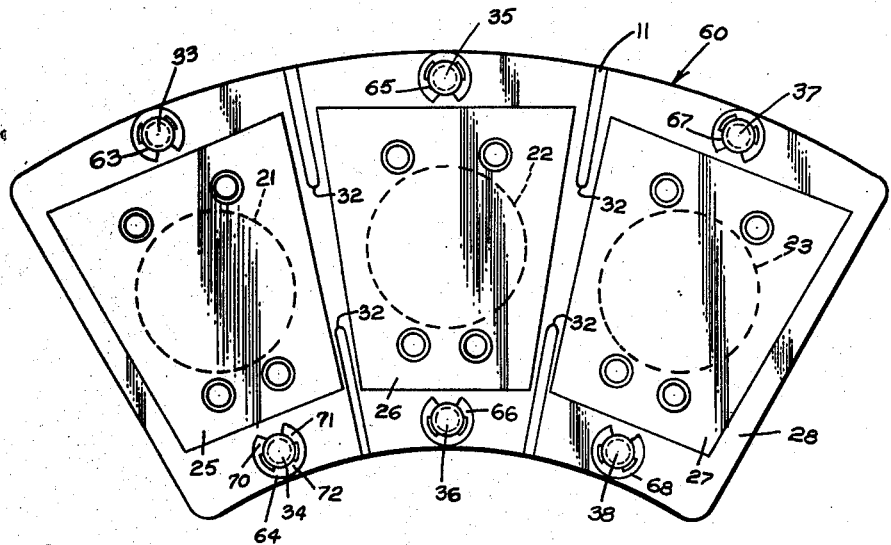
Fig. 3 is a plan view, similar to Fig. 1, of another embodiment of the invention.

The brake unit 60 illustrated in Fig. 3 is in most respects essentially similar to that shown in Figs. 1 and 2 and comprises a brake head 11 which may be essentially identical in construction to the previously described brake head. The three friction elements 25, 26 and 27, as before, are supported upon a carrier member 28 which engages the three resilient pads 21, 22 and 23 supported within suitable recesses in the brake head. The brake head in this embodiment is also provided with six mounting studs 33–38 which may be essentially identical in construction to the similarly numbered studs of the first described embodiment.

The principal difference between the embodiments of Figs. 1 and 3 is in the retaining elements 63, 64, 65, 66, 67 and 68 associated with studs 33, 34, 35, 36, 37 and 38 respectively. Each of these retaining elements is complete in and of itself and includes a plurality of segments which engage in the peripheral slot of the stud with which the element is associated. Thus, retaining element 64 includes three segments 70, 71 and 72 which, when the shoe is assembled, are forced into the slot of stud 38 and thereby serve to retain the brake shoe carrier member 28 in its desired position in relation to the brake head of the unit. Operationally, this embodiment is essentially similar to that described hereinabove, although it may require a very slightly longer time for brake shoe replacement than the other arrangement.

Figs. 4 and 5 illustrate another embodiment of the invention which is in many respects quite similar to that described hereinabove in connection with Figs. 1 and 2. The brake unit 80 comprises a brake head 11, including mounting studs 33–38, which is essentially similar to the brake head described hereinbefore and which includes a series of recesses within which the resilient pads 21–23 are mounted. As before, the pads extend for a short distance above the face 12 of the brake head as indicated in Fig. 5. The friction elements 25–27 for this embodiment are essentially similar to those described hereinabove and are again bonded, riveted, or otherwise suitably affixed to a sheet metal carrier member 88. Carrier member 88 is very slightly different from the sheet metal carrier member 28, however, in that two series of retainer slots 89 and 90 are formed therein in addition to the apertures provided for the mounting studs 33–38.

The retaining strips 93 and 94 for this embodiment of the invention are also somewhat different from those previously described. Strip 93 is provided with three openings 95, 96 and 97, each of which defines a separate retaining element, whereas strip 94 is provided with a similar series of openings 98, 99 and 100. Opening 98 has an enlarged central portion 101 large enough to permit passage of the stud 34 therethrough and two laterally extending portions 102 and 103 which afford retaining element segments for engaging in the retainer slot 41 of the stud. The other retainer element openings in the two strips are of similar configuration. In addition, strip 94 is provided at its ends with a pair of depending lugs 105, whereas strip 93 is provided with a similar pair of lugs 106.

The embodiment of Fig. 4 differs from those described hereinbefore primarily in the manner of assembly. With the brake shoe comprising friction elements 25–27 and their carrier 88 in mounting position on the brake head, the retainer strip 93 is placed over the three studs with which it cooperates, the enlarged central openings of the retainer elements of the strip making it possible to move the strip downwardly over the studs until it is aligned with the peripheral slots in the studs. The strip is then moved longitudinally until the two lugs 106 engage in two of the openings 89 in carrier member 88. This same procedure is followed to mount the other retaining strip 94 on the brake unit, this strip being held in position by engagement of the lugs 105 in two of the retainer slots 90. In performance, cost of construction, and relative ease of maintenance, this brake unit is in almost all respects essentially equivalent to that described hereinabove in connection with Figs. 1 and 2.

Figure 6:
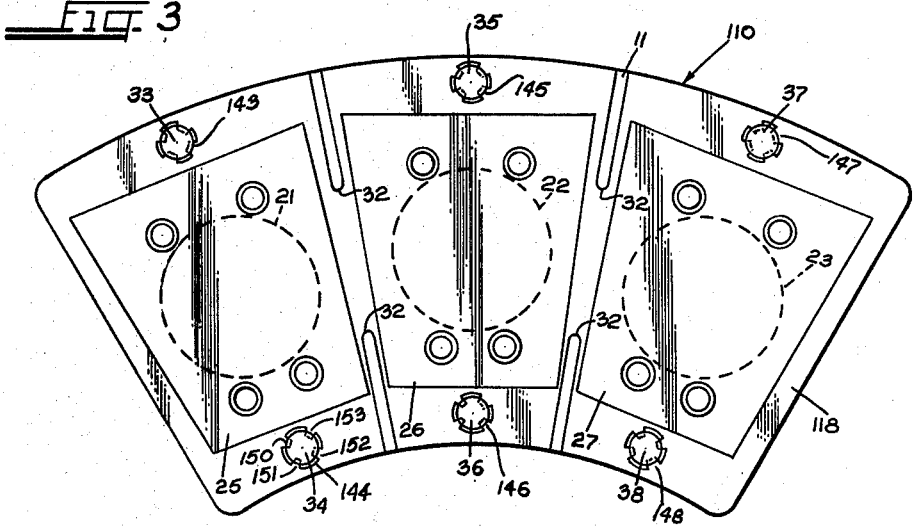
Fig. 6 is a plan view of a brake unit constructed in accordance with yet another embodiment of the invention.

The embodiment of Fig. 6 is also generally similar in construction to that described hereinabove in connection with Figs. 1 and 2 but offers certain advantages with respect thereto, particularly insofar as initial cost is concerned. This brake unit 110 employs a brake head 11, including mounting studs 33–38, which is essentially identical to that of the first-described embodiment and which includes provisions for mounting the three resilient pads 21–23 thereon. Moreover, and also as in the previously described structures, the brake unit 110 includes a plurality of friction elements 25–27 corresponding in number to the resilient pads and supported in shock-absorbing relationship with respect to the pads. In this instance, however, the three friction elements are bonded or otherwise secured to a sheet metal carrier member 118 which is somewhat different in construction from those of the previous embodiments.

Sheet metal carrier 118 is arcuate in configuration, being similar in this respect to the configuration of the face of the brake head, and, as before, is preferably provided with a series of slots 32 dividing the carrier into individual friction element support sections. In this instance, however, a series of retaining elements 143–148 are formed as an integral part of the sheet metal carrier and are utilized to engage mounting studs 33–38 respectively. Considering the retaining element 144 as exemplary of this series of retaining elements, it is seen that it comprises four individual slot-engaging segments 150, 151, 152 and 153. It will thus be seen that the entire brake shoe comprising carrier 118 and friction elements 25–27 may be mounted on the brake head simply by forcing the carrier member over the mounting studs 33–38 until the individual segments of each of the retaining elements 143–148 are securely seated in the peripheral slots of the studs. With this construction, the individual retaining elements are incorporated directly into the carrier member of the brake shoe as integral parts thereof. Accordingly, the manufacturing procedure is substantially simplified; the carrier member can still be fabricated in a single punching operation and the retaining strips and/or individual retaining elements of the other embodiments are eliminated both from the manufacturing procedure and from the parts stock requirements of the braking system. This is particularly advantageous from the standpoint of maintenance procedure, since the maintenance worker need only obtain a supply of brake shoes in order to effect needed replacements and there is no possibility of being unable to mount a new brake shoe for lack of suitable fastening devices.

The braking apparatus illustrated in Fig. 7 is in most respects essentially similar to those described hereinabove, but includes a further safety feature which may be incorporated in any of the previously described embodiments of the invention. Thus, the brake unit shown in this figure includes a brake head 11, which may be provided with lugs 15 for connecting the brake head to a suitable brake actuating mechanism. The brake unit further includes a brake shoe comprising a metal carrier member 28 and three individual friction elements 25, 26 and 27 affixed thereto. It will be understood that this brake shoe may be considered as representative of any of the previously described brake shoe structures. The brake shoe is supported above the surface of brake head 11 upon the three resilient pads 21, 22 and 23 as in the previously described embodiments and may be secured to the brake head by any of the previously described arrangements such as the fastener strips 53 and 54 which engage in the slots of the posts 33–38.

In this embodiment, the three posts 34, 36 and 38 are provided with suitable apertures for receiving a safety wire 200. After the brake unit has been completely assembled as described hereinabove, a safety wire is extended through the apertures in the posts and bent at the ends to retain it in position. The safety wire 200 thus affords a second fastening device which is effective to retain the brake shoe in position on brake head 11 in the event that the other fastening means, in this instance comprising the fastening device 54, is broken or detached during operation of the brake. Similarly, the posts 33, 35 and 37 on the other side of the brake unit are drilled or otherwise provided with suitable apertures for receiving a second safety wire 201 which protects the brake unit in the event of failure of the fastening device 53.

In most applications, the secondary fastening arrangement provided by the safety wires 200 and 201 is not essential since the speed fasteners of the invention are not prone to failure in normal usage, In some instances, however, where the operating services such that the brake units are subjected to extreme vibrations or shock conditions, it may be desirable to utilize the safety wire arrangement to preclude any possibility of damage to the brake mechanism and to the equipment on which it is utilized in the event of failure of the basic fastening devices, Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A brake unit for engaging a radial surface of a brake rotor in frictional braking contact comprising: a brake head of substantially arcuate configuration adapted to be supported with one face thereof in juxtaposition to the radial surface of a brake rotor, said one face of the brake head having a plurality of individual recesses of substantially uniform depth formed therein; a corresponding plurality of resilient pads individually disposed in the brake head recesses, each pad having a height greater than the depth of said recesses; a sheet metal carrier member of arcuate configuration substantially corresponding to the configuration of said brake head face; a plurality of friction elements engaged by said carrier member and maintained thereby in effective shock-absorbing contact with respective ones of said resilient pads; a series of studs affixed to the brake head and extending from said one face thereof through a corresponding series of apertures in said carrier member, each of the studs having a slot therein located above the plane of the exposed surfaces of said resilient pads; and means comprising a pair of elongated unitary arcuate sheet metal strips each extending across a major portion of one arcuate edge of said carrier member and including a plurality of integral retaining elements, said retaining elements each including at least one segment engageable in the slot of one of said studs, for retaining said carrier member in predetermined position upon said brake head.

2. A brake unit for engaging a radial surface of a brake rotor in frictional braking contact comprising: a brake head of substantially arcuate configuration adapted to be supported with one face thereof in juxtaposition to the radial surface of a brake rotor; at least one resilient pad supported upon said one face of the brake head; a brake shoe comprising a plurality of friction elements affixed to one surface of a sheet metal carrier member of arcuate configuration substantially corresponding to the configuration of said brake head face; a series of studs affixed to the brake head and extending from said one face thereof through a corresponding series of apertures in said brake shoe carrier member, each of said studs having a slot therein located above the exposed surface of said resilient pad; and means comprising a pair of elongated unitary arcuate sheet metal strips each extending across a major portion of one arcuate edge of said carrier member and each including at least two retaining elements, said retaining elements each including at least one segment engageable in the slot of one of said studs, for retaining said brake shoe in predetermined position upon said brake head with the surface of said carrier member opposite said friction elements in engagement with said rubber pads.

3. A brake unit for engaging a radial surface of a brake rotor in frictional braking contact comprising: a brake head of substantially arcuate configuration adapted to be supported with one face thereof in juxtaposition to the radial surface of a brake rotor, said one face of the brake head having a plurality of individual recesses of substantially uniform depth formed therein; a corresponding plurality of resilient rubber pads individually disposed in the brake head recesses, each pad having a height greater than the depth of said recesses; a brake shoe comprising a corresponding plurality of friction elements affixed to one surface of a sheet metal carrier member of arcuate configuration substantially corresponding to the configuration of said brake head face; a series of studs affixed to the brake head and extending from said one face thereof through a corresponding series of apertures in said brake shoe carrier member intermediate said friction elements and the arcuate edges of said carrier member, each of said studs having a peripheral slot therein located above the plane of the exposed surfaces of said rubber pads; and means comprising a pair of elongated unitary arcuate sheet metal strips each extending across a major portion of one arcuate edge of said carrier member and each including a series of sheet metal retaining elements, each retaining element including a plurality of angularly displaced segments individually engageable in the slot of one of said studs, for retaining said brake shoe in predetermined position upon said brake head with the surface of said carrier member opposite said friction elements in engagement with said rubber pads.

References Cited in the file of this patent

UNITED STATES PATENTS

| | | |
|---|---|---|
| 1,481,095 | Hoffman | Jan. 15, 1924 |
| 1,787,376 | Hoffman | Dec. 30, 1930 |
| 2,214,762 | Eksergian | Sept. 17, 1940 |
| 2,451,326 | Eksergian | Oct. 12, 1948 |
| 2,656,020 | McCune | Oct. 20, 1953 |
| 2,687,786 | Kelley | Aug. 31, 1954 |